(12) United States Patent
Paulino et al.

(10) Patent No.: US 9,327,834 B2
(45) Date of Patent: May 3, 2016

(54) OVERHEAD BIN SYSTEM

(71) Applicant: EMBRAER S.A., São José dos Campos—SP (BR)

(72) Inventors: Amauri Paulino, São José dos Campos (BR); Sergio Luiz Abdalla Gomide, São José dos Campos (BR); Gustavo Selofite De Arruda, São José dos Campos (BR); Nilmar César Ferreira, São José dos Campos (BR); Luciano Dos Santos Ribeiro, São José dos Campos (BR); Demétrio Andrade De Campos, São José dos Campos (BR); Sergio Augusto Meireles Filho, São José dos Campos (BR); Frederico Lara De Oliveira, São José dos Campos (BR); Douglas Gonçalves De Albuquerque, São José dos Campos (BR); Helio Albino, São José dos Campos (BR); André Duarte Stein, São José dos Campos (BR); Paul Priestman, London (GB); Daniel Macinnes, London (GB)

(73) Assignee: EMBRAER S.A., São José dos Campos—SP (BR)

( * ) Notice: Subject to any disclaimer, the term of this patent is extended or adjusted under 35 U.S.C. 154(b) by 38 days.

(21) Appl. No.: 14/287,731

(22) Filed: May 27, 2014

(65) Prior Publication Data

US 2015/0097081 A1 Apr. 9, 2015

Related U.S. Application Data

(60) Provisional application No. 61/887,316, filed on Oct. 4, 2013.

(51) Int. Cl.
*B64D 11/00* (2006.01)

(52) U.S. Cl.
CPC ...... *B64D 11/003* (2013.01); *B64D 2011/0053* (2013.01)

(58) Field of Classification Search
None
See application file for complete search history.

(56) References Cited

U.S. PATENT DOCUMENTS 5,817,409 A * 10/1998 Stephan ............ B29B 15/122
428/116
5,868,353 A * 2/1999 Benard ............ B64D 11/003
244/118.1

(Continued)

*Primary Examiner* — Medhat Badawi
(74) *Attorney, Agent, or Firm* — Nixon & Vanderhye P.C.

(57) ABSTRACT

Overhead bin assembly for transport vehicles (e.g., transport category aircraft) are provided with a generally U-shaped bin shell having a bottom wall, an outboard end wall and an upper wall defining an interior stowage space having an inboard opening opposite the end wall. A pair of separated transverse bin supports defining a bin space therebetween may be provided along with a bin door for closing the inboard opening. A cantilever hinge may be provided so as to connect the bin door to the transverse bin support in a cantilever manner to allow for pivotal movement of the bin door between closed and open positions relative to the inboard opening. An arcuate recessed wall may be positioned inboard relative to the upper wall of the bin shell (e.g., as a unitary (one-piece) extension thereof) such that the bin door is received within the recessed wall when in the open position thereof.

19 Claims, 4 Drawing Sheets

(56) References Cited

U.S. PATENT DOCUMENTS

| | | | | |
|---|---|---|---|---|
| 5,988,565 A * | 11/1999 | Thomas | B64D 11/003 | 244/118.1 |
| 6,290,175 B1 * | 9/2001 | Hart | B64D 11/003 | 244/118.1 |
| 6,318,671 B1 * | 11/2001 | Schumacher | B64D 11/003 | 244/118.5 |
| 6,398,163 B1 * | 6/2002 | Welch | B64D 11/003 | 244/118.1 |
| 6,733,061 B1 * | 5/2004 | Dykema | B60R 7/04 | 296/37.7 |
| 7,097,138 B2 * | 8/2006 | Stephan | B61D 37/003 | 244/118.6 |
| 2006/0151668 A1 * | 7/2006 | Scown | B64D 11/003 | 244/118.1 |
| 2007/0109802 A1 * | 5/2007 | Bryan | B60Q 3/025 | 362/471 |
| 2007/0253674 A1 * | 11/2007 | Druckman | B64D 11/003 | 385/147 |
| 2008/0078871 A1 * | 4/2008 | Munson | B64D 11/003 | 244/118.5 |
| 2008/0150301 A1 * | 6/2008 | Homner | B64D 11/003 | 292/95 |
| 2008/0251640 A1 * | 10/2008 | Johnson | B64D 11/003 | 244/118.1 |
| 2009/0103320 A1 * | 4/2009 | Clark | B60Q 3/025 | 362/470 |
| 2010/0096919 A1 * | 4/2010 | Meckes | B60Q 3/0206 | 307/9.1 |
| 2010/0264268 A1 * | 10/2010 | Schneider | B64D 11/003 | 244/118.5 |
| 2011/0253837 A1 * | 10/2011 | Lee | B64D 11/003 | 244/118.5 |
| 2012/0012702 A1 * | 1/2012 | Moritz | F16F 1/18 | 244/118.5 |
| 2013/0200213 A1 | 8/2013 | Umlauft et al. | | |

* cited by examiner

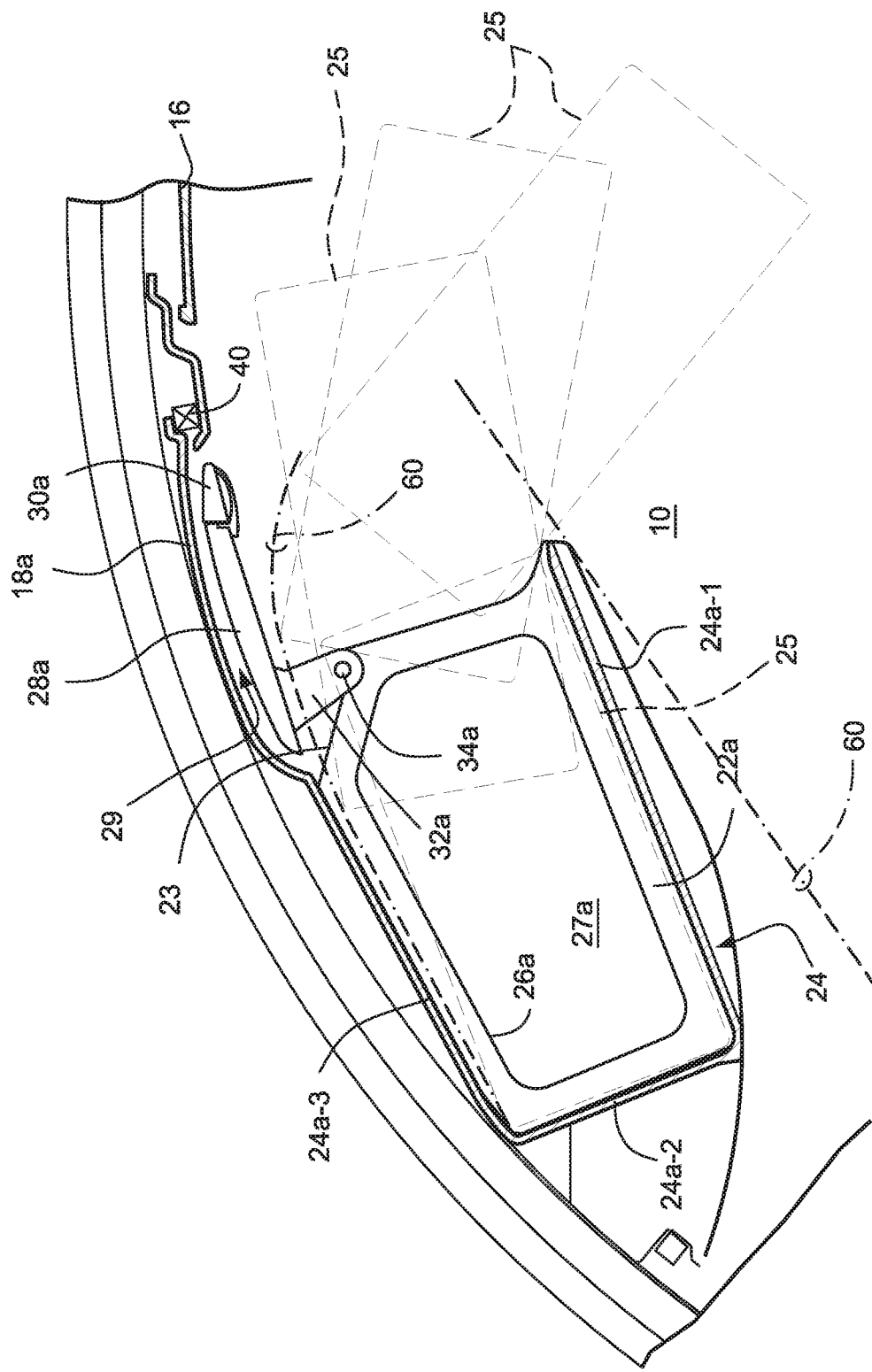

OVERHEAD BIN SYSTEM

CROSS-REFERENCE TO RELATED APPLICATIONS

This application is based on and claims domestic priority under 35 USC §119(e) to U.S. Provisional Application Ser. No. 61/887,316 and is related to commonly owned U.S. Design Patent Application No. 29/469,014, each being filed on Oct. 4, 2013, the entire contents of each such prior filed application being expressly incorporated hereinto by reference.

FIELD

The embodiments disclosed herein relate generally to interiors for transport vehicles, especially aircraft interior cabins. More specifically, the embodiments disclosed herein relate to overhead storage assemblies that may usefully be employed in the interiors of transport vehicles (e.g., aircraft cabins) for the overhead storage of luggage and/or other on-board items.

BACKGROUND

The current overhead bins for certain smaller size transport category aircraft are typically not adapted to stow conventional roll-aboard luggage (e.g., wheeled luggage having a nominal size of about 22"×14"×10") in a wheels-first position (i.e., position whereby the luggage is positioned in the overhead bin with the wheels facing the lateral side wall of the storage compartment). The storage bins which currently offer this capability are thus provided for larger categories of transport aircraft having a wider cross-sectional cabin dimension (e.g., so-called wide-body aircraft).

While these relatively larger storage bins could conceivably be adapted for use in smaller cross-sectional aircraft cabins, their presence would necessarily restrict the cabin space available for passengers and crew members that would then not provide an overall sensation of a spacious cabin. Such space restriction could also present obstacles to the passengers during boarding and disembarking.

One prior proposal for an overhead bin assembly is disclosed in US Patent Application Publication No 2013/0200213 (the entire content of which is expressly incorporated hereinto by reference). According to this prior proposal, a module is provided at a particular position, directly related to a fuselage cross-section installation. However, the overhead bin as proposed by this publication does not solve the specific problem of providing an overhead compartment with greater internal capacity for aircraft with generally smaller cross-sectional cabins without the loss of valuable head room space for passengers and crew members.

Therefore, what has been needed in this art is an overhead storage bin assembly for cabins of transport category vehicles (e.g., aircraft, trains, buses and the like) that will accommodate conventional roll-aboard luggage in a wheels-first position therein while minimizing any loss of valuable overhead cabin space. It is towards fulfilling such a need that the embodiments of the present invention are directed.

SUMMARY

In general, the embodiments disclosed herein are directed toward overhead bin assembly for transport vehicles having a generally U-shaped bin shell having a bottom wall, an outboard end wall and an upper wall defining an interior stowage space having an inboard opening opposite the end wall. A pair of separated transverse bin supports defining a bin space therebetween may be provided along with a bin door for closing the inboard opening. A cantilever hinge may be provided so as to connect the bin door to the transverse bin support in a cantilever manner to allow for pivotal movement of the bin door between closed and open positions relative to the inboard opening.

According to certain embodiments, the overhead bin assembly may include an arcuate recessed wall positioned inboard relative to the upper wall of the bin shell such that the bin door is received within the recessed wall when in the open position thereof. According to some embodiments the arcuate recessed wall is formed as a unitary (one-piece) extension of the upper wall.

Some other embodiments provide for an overhead bin assembly for transport vehicles having an open ended bin shell defining an interior bin space to accommodate stowed items, and a recessed ceiling wall adjacent an upper wall of the bin shell. A lighting fixture is provided so as to emit light toward the interior space of the bin shell along the recessed ceiling wall. A bin door is moveable between closed and open positions to respectively close and open the open-ended bin shell, the bin door being received within the recessed ceiling wall when in the open position thereof. A channel space will thus be defined between the bin door and the recessed ceiling wall when the bin door is in the open position thereof to thereby allow light from the lighting fixture to be directed into the interior space of the bin when the bin door is in the open position thereof.

In especially preferred embodiments, starboard and port overhead bin assemblies are respectively provided overhead of starboard and port rows of seats in an aircraft cabin.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIG. 4 is a partial end elevational view similar to FIG. 3 showing a sequence whereby luggage may be stowed in the bin.

DETAILED DESCRIPTION

Figure 1:
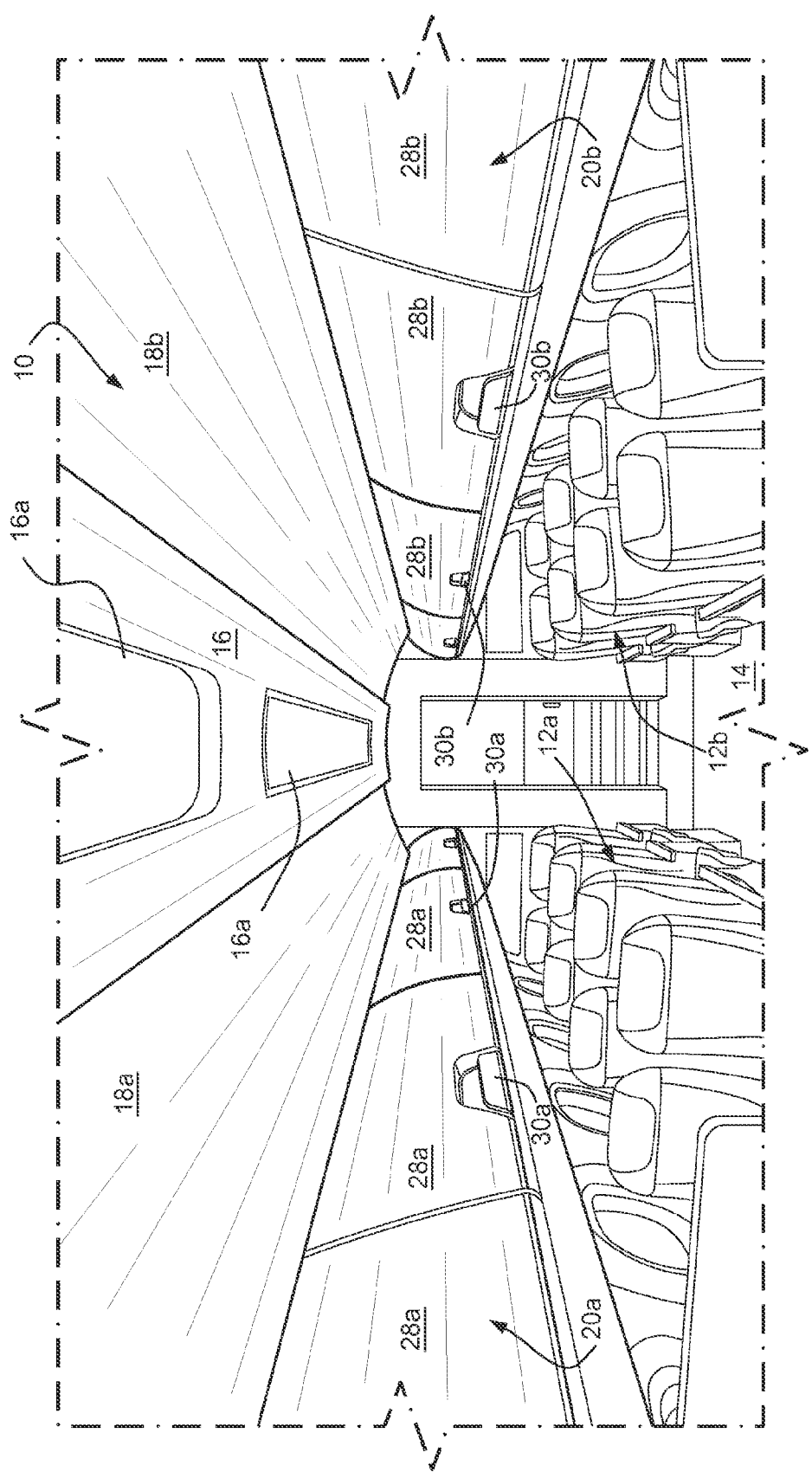
FIG. 1 is perspective view looking aft of an interior aircraft cabin which includes overhead storage bin assemblies according to the embodiments described herein and shown with the bin doors in a closed position.
Figure 2:
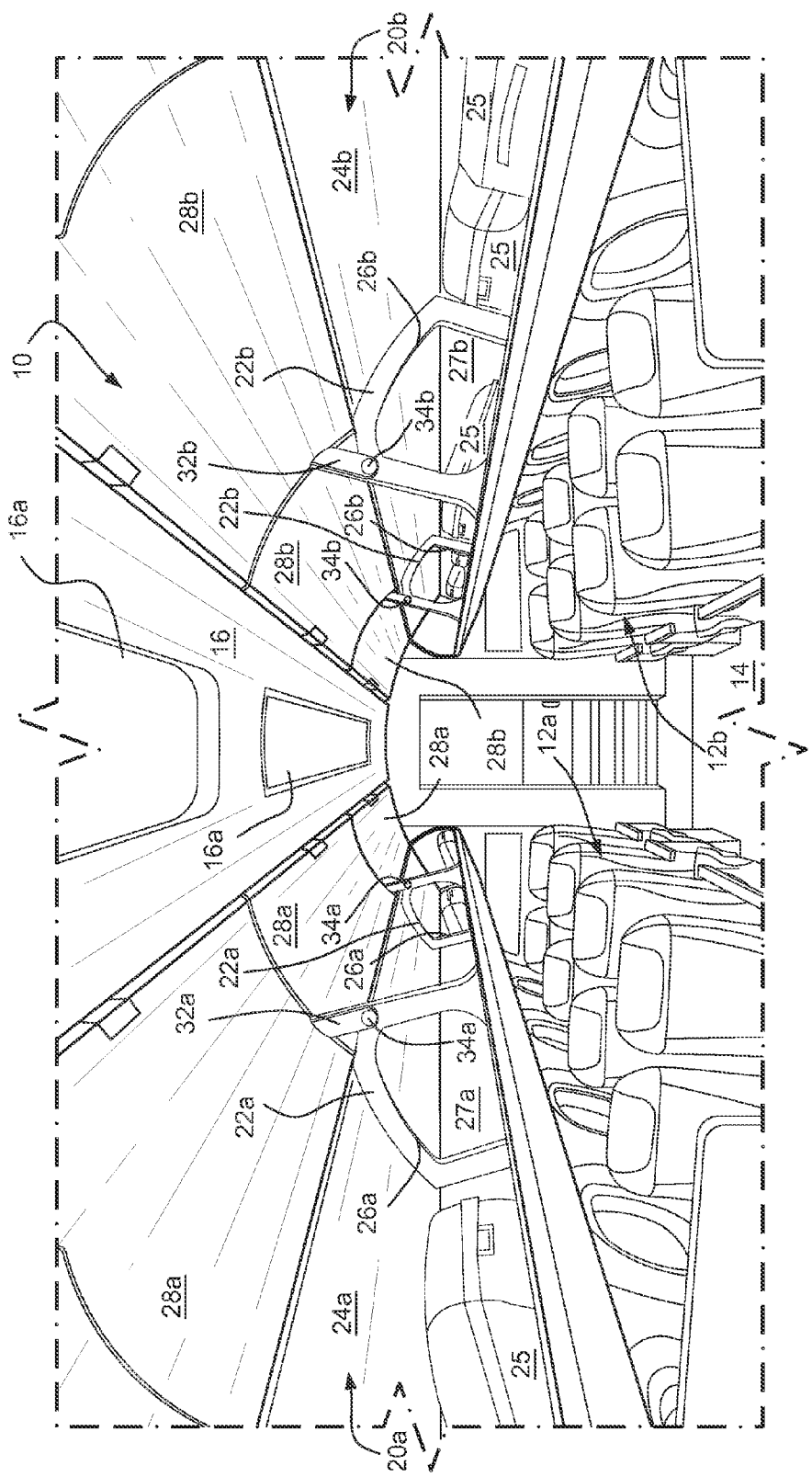
FIG. 2 is a perspective view similar to FIG. 1 but depicted with the storage bin doors in an opened position.

Accompanying FIGS. 1 and 2 are perspective views looking aft of a generally cylindrically shaped aircraft cabin 10 which includes starboard and port seat rows 12a, 12b, respectively, on opposite sides of a central aisle 14. A cross-sectionally arcuate ceiling 16 is positioned lengthwise along the top of the cabin 10 above the aisle 14 and may include lighting recesses to 16a to allow for overhead lighting as may be desired. Cross-sectionally arcuate starboard and port recessed ceiling walls 18a, 18b, respectively, are provided on each respectively lateral side of the ceiling 16. In this regard, the curvatures of the recessed ceiling walls 18a, 18b are substantially the same as the curvature of the ceiling 16 so as to present an overall arcuate design line that promotes a spacious feel for the cabin 10.

Overhead bin assemblies 20a, 20b are positioned over each of the starboard and port rows of seats 12a, 12b, respectively. Each overhead bin assembly 20a, 20b is provided with upright divider supports 22a, 22b which are separated from one another in the lengthwise direction of the aircraft cabin 10 but positioned in a transverse bisecting plane relative thereto so as to delineate respective storage spaces therebetween. The bin divider supports 22a, 22b are rigidly attached to the aircraft structure for supporting open-ended generally U-shaped bin shells 24a, 24b defining an interior space for accommodating carry-on luggage (a few examples of which are identified by the reference numeral 25) in FIGS. 1 and 2. As can be seen in FIG. 1, each of the bin divider supports 22a, 22b includes an interior edge 26a, 26b which defines an open space 27a, 27b, respectively, to allow access between adjacent bins (thereby allowing bin space to be utilized more efficiently for the stowage of relatively soft articles (e.g., passenger outwear, blankets, pillows and the like).

The bin assemblies 20a, 20b are also provided with bin doors 28a, 28b to cover the bin opening defined by each of the shells 24a, 24b, respectively. Each door 28a, 28b includes a latch 30a, 30b which allows doors to be releasably latched for movements between the closed position (as shown in FIG. 1) and the opened position (as shown in FIG. 2) thereof.

Figure 3:
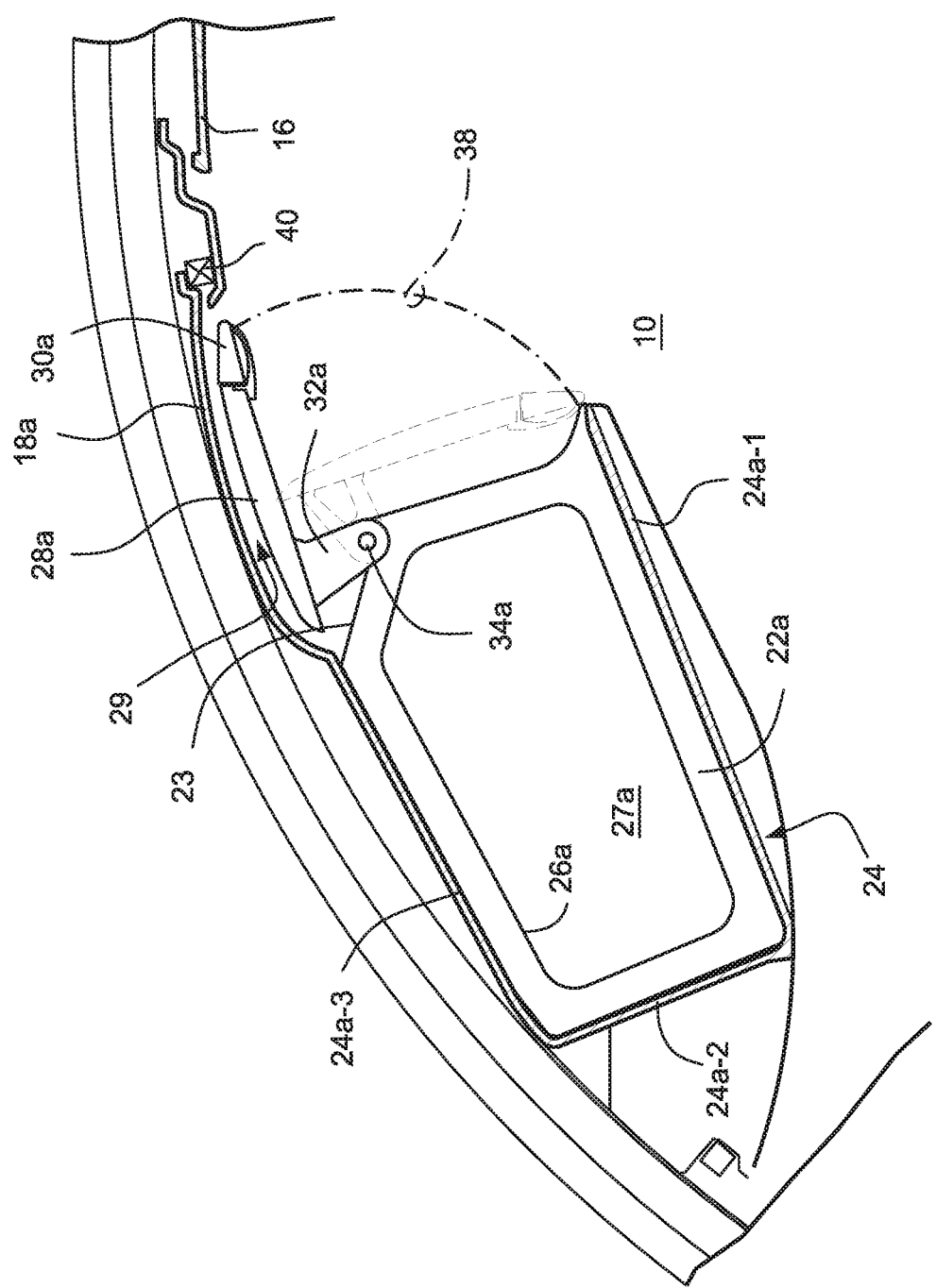
FIG. 3 is a partial end elevational view of a representative storage bin showing the door in an opened position.

As is perhaps more clearly depicted in the enlarged cross-sectional views of the starboard bin assembly 20a shown in FIGS. 3 and 4, the door 28a is mounted to a cantilever hinge 32a that the door 28a is mounted to the support 22a in a cantilever manner. The door 28a is thereby pivotally moveable about pivot pin 34a which is coupled pivotally to the support 22a between opened and closed positions (i.e., as depicted by FIGS. 1 and 2, respectively). Each of FIGS. 3 and 4 show the door 28a in an opened position in solid line, with FIG. 3 depicting the door 28a in a closed position in dashed line. It will understood that corresponding cantilever hinges 32b and pivot pins 34b are similarly provided for the bin assembly 20b as shown by FIG. 2. Thus, a discussion of such structures in relation to the bin assembly 20a is equally applicable to the similar structures provided with bin assembly 20b also.

As noted briefly above, the bin shell 24a is a generally U-shaped structure having an inboard (i.e., relative to the center of the cabin 10) open end defined by a bottom wall 24a-1, an outboard end wall 24a-2 opposite the open end and an upper wall 24a-3. In the embodiment depicted, the bin shell 24a and the recessed ceiling wall 18a are formed as a one-piece structure with the recessed ceiling wall 18a being a unitary extension of the upper wall 24a-3. However, separate structural elements could also be provided if desired. It will also be observed that the recessed wall 18a extends in an outboard direction beyond the forward opening defined by the bin shell 24a.

The hinge 32 is fixed to the interior of the bin door 28a so that the latter is cantilevered to the former. The lower edge of the door 28a thus traverses an arcuate path (shown by dot-dash line 38 in FIG. 3) of a radius established by the pin 34a. The door 28a is therefore off-set from the pivot pin 32 by a lengthwise cantilever arm corresponding to the length of the hinge 32a. In such a manner, therefore, the rearward end of the door 28a is positioned laterally beyond the open end of the bin shell 22a and is accommodated within the arcuate recess defined by the recessed ceiling wall 18a. In order to accommodate such positioning, an upper edge region 23 of the support 22a is beveled. Thus, the door when in the opened position as shown by FIG. 3 does not restrict the headroom within the aircraft cabin 10.

In addition to the advantages noted above, the door 28a when in the opened position so as to be in general conformance to the arcuate curvature of the recessed ceiling wall 18a will also define a channel space 29 therebetween. The channel space 29 will therefore allow light emitted by lighting fixture 40 to be channeled into the interior space of the bin shell 24a thereby illuminating the same.

The positioning of the bin door 28a in the manner described above will also allow roll-aboard luggage to be positioned wheels first in the storage bin space since the entire interior volume of the storage bin may then be utilized (i.e., the door 28a does not effectively mask useable volume when in its opened position as may be the case with conventional bin doors). The manner in which a maximum-sized roll-aboard luggage 25 (i.e., having a maximum nominal size of about 22"×14"×10") may be placed wheels first within the bin is shown by the sequential dashed lines in FIG. 4. In this regard, the dot-dash line 50 represents a generally arcuate path that is traced by the upper edge of the luggage 25 when it is being inserted into the bin.

With the arrangement as described above, the bottom wall 24a-1 of the bin shell 24a may be angularly slanted upwardly toward the ceiling 16 without impinging on the ability of the luggage 25 to be stowed within the bin. Moreover, this upward slant of the bottom wall 24a-1 thus establishes a line of sight (noted by the dot-dash line 60 in FIG. 4) by which a passenger standing in the aisle 14 may visible see a side window of the cabin 10. Moreover, a passenger seated adjacent to the window (i.e., in an outboard seat of the seat rows 12a or 12b) will have a line of sight to the ceiling 16. In such a manner, therefore, the overhead bin assemblies 20a, 20b do not impinge on the feeling of spaciousness within the cabin 10.

The bin assemblies 20a, 20b and their associated recessed ceiling walls 18a, 18b, respectively, may be employed in virtually any transport category of vehicle. Therefore, while an aircraft cabin has been described previously in reference to the accompanying drawing FIGS. 1-4, it will be understood that such a description is presently considered to be the most practical and preferred embodiment of the invention. Thus, the invention is not to be limited to the disclosed embodiment, but on the contrary, is intended to cover various modifications and equivalent arrangements included within the spirit and scope thereof.

What is claimed is:

1. An overhead bin assembly for transport vehicles comprising:

a generally U-shaped bin shell having a bottom wall, an outboard end wall and an upper wall defining an interior stowage space having an inboard opening opposite the end wall;

a pair of separated transverse bin supports and a bin space defined between the separated transverse bin supports;

a bin door for closing the inboard opening;

a cantilever hinge connecting the bin door to the transverse bin support in a cantilever manner to allow for pivotal movement of the bin door between a closed position and an open position relative to the inboard opening;

a recessed arcuate ceiling wall extending from the upper wall of the bin shell as a unitary one-piece extension of the upper wall; and a lighting fixture positioned at a terminal end of the recessed ceiling wall to emit light toward the interior space of the bin shell along the recessed ceiling wall, wherein the bin door defined a channel space with the recessed ceiling wall when the bin door is in the open position, and wherein the lighting fixture directs light into the channel space above the bin door and into the interior space of the bin when the bin when the bin door is in the open position.

2. The overhead bin assembly as in claim 1, further comprising a bin support, wherein the bin support includes an interior edge which defines an open space between adjacent bin spaces.

3. The overhead bin assembly as in claim 1, wherein the hinge includes a pivot pin for pivotally connecting the hinge to the support, wherein the bin door is off-set relative to the pivot pin by a cantilever arm corresponding to the cantilever hinge.

4. An aircraft having an interior cabin which includes an overhead bin assembly as in claim 1.

5. An overhead bin assembly for transport vehicles comprising:

an open ended bin shell defining an interior bin space to accommodate stowed items;

a recessed ceiling wall extending from the upper wall of the bin shell as a unitary one-piece extension of the upper wall;

a lighting fixture positioned at a terminal end of the recessed ceiling wall to emit light toward the interior space of the bin shell along the recessed ceiling wall;

a bin door moveable between a closed position and an open position to respectively close and open the open-ended bin shell, the bin door being received within the recessed ceiling wall when in the open position; and a channel space defined between the bin door and the recessed ceiling wall when the bin door is in the open position to allow light from the lighting fixture to be directed through the channel space above the bin door and into the interior space of the bin when the bin door is in the open position.

6. The overhead bin assembly as in claim 5, wherein the recessed ceiling wall is arcuate.

7. The overhead bin assembly as in claim 5, further comprising a pair of separated transverse bin supports, wherein the bin space is defined between the pair of separated transverse bin supports.

8. The overhead bin assembly as in claim 7, wherein the transverse bin supports include respective interior edges which define an open space.

9. The overhead bin assembly as in claim 5, further comprising a cantilever hinge having a pivot pin, wherein the bin door is off-set relative to the pivot pin by a cantilever arm corresponding to the cantilever hinge for pivotal movements between the closed position and the open position of the bin door.

10. An aircraft having an interior cabin which includes an overhead bin assembly as in claim 5.

11. An aircraft comprising an interior cabin which includes:

starboard and port rows of seats;
an aisle between the starboard and port rows of seats;
a ceiling positioned over the aisle;
starboard and port recessed walls each positioned outboard of the ceiling; and starboard and port overhead bin assemblies positioned over the starboard and port rows of seats, respectively, wherein each of the starboard and port overhead bin assemblies includes, (i) a generally elongated U-shaped bin shell having a bottom wall, an outboard end wall and an upper wall defining an interior stowage space having an inboard opening opposite the end wall;

(ii) a pair of separated transverse bin supports and a bin space defined between the separated transverse bin supports;

(iii) a bin door for closing the inboard opening;

(iv) a cantilever hinge connecting the bin door to the transverse bin support in a cantilever manner to allow for pivotal movement of the bin door between a closed position and an open position relative to the inboard opening;

(v) a recessed ceiling wall extending in an inboard director from the upper wall of the bin shell as a unitary one-piece extension of the upper wall;

(vi) a lighting fixture positioned at a terminal end of the recessed ceiling wall to emit light toward the interior space of the bin shell along the recessed ceiling wall; and (vii) a channel space defined between the bin door and the recessed ceiling wall when the bin door is in the open position to allow light from the lighting fixture to be directed through the channel space above the bin door and into the interior space of the bin above the bin door when the bin door is in the open position.

12. The aircraft as in claim 11, wherein each of the starboard and port recessed walls is arcuately shaped, and wherein the bin doors of the starboard and port overhead bin assemblies are received within a respective one of the starboard and port recessed walls when in the open position.

13. The aircraft as in claim 11, wherein the transverse bin supports include an interior edge which defines an open space between adjacent bin spaces.

14. The aircraft as in claim 11, wherein the hinge includes a pivot pin for pivotally connecting the hinge to the support, wherein the bin door is off-set relative to the pivot pin by a cantilever arm corresponding to the cantilever hinge.

15. An aircraft comprising an interior cabin which includes:

starboard and port rows of seats;
an aisle between the starboard and port rows of seats;
a ceiling positioned over the aisle;
starboard and port recessed walls each positioned outboard of the ceiling; and
starboard and port overhead bin assemblies positioned over the starboard and port rows of seats, respectively, wherein
each of the starboard and port overhead bin assemblies includes, (i) an open ended elongated U-shaped bin shell defining an interior bin space to accommodate stowed items, the bin shell having opposed and upper walls;

(ii) a recessed ceiling wall extending from the upper wall of the bin shell as a unitary one-piece extension of the upper wall;

(iii) a lighting fixture positioned at a terminal end of the recessed ceiling wall to emit light toward the interior space of the bin shell along the recessed ceiling wall;

(iv) a bin door moveable between a closed position and an open position to respectively close and open the open-ended bin shell, the bin door being received within the recessed ceiling wall when in the open position; and (v) a channel space defined between the bin door and the recessed ceiling wall when the bin door is in the open position to allow light from the lighting fixture to be directed through the channel space above the bin door and into the interior space of the bin when the bin door is in the open position.

16. The overhead bin assembly as in claim 15, wherein the recessed ceiling wall is arcuate.

17. The overhead bin assembly as in claim 15, further comprising a pair of separated transverse bin supports, wherein the bin space is defined between the pair of separated transverse bin supports.

18. The overhead bin assembly as in claim 17, wherein the transverse bin supports include respective interior edges which define an open space.

19. The overhead bin assembly as in claim 15, further comprising a cantilever hinge having a pivot pin, wherein the bin door is off-set relative to the pivot pin by a cantilever arm corresponding to the cantilever hinge for pivotal movements between the closed position and the open position of the bin door.

* * * * *